United States Patent [19]

de Carle

[11] Patent Number: 4,704,016
[45] Date of Patent: Nov. 3, 1987

[54] BIFOCAL CONTACT LENSES

[75] Inventor: John T. de Carle, Tilford, Nr.Farnham, England

[73] Assignee: N.G. Trustees & Nominees, Ltd., St. Helier, Channel Islands

[21] Appl. No.: 541,454

[22] Filed: Oct. 13, 1983

[30] Foreign Application Priority Data

Oct. 13, 1982 [GB] United Kingdom ............... 8229211

[51] Int. Cl.$^4$ .............................................. G02C 7/04
[52] U.S. Cl. ................................................... 351/161
[58] Field of Search ............... 351/160 R, 160 H, 161, 351/162

[56] References Cited

U.S. PATENT DOCUMENTS

| 3,794,414 | 2/1974 | Wesley | 351/161 |
| 4,162,122 | 7/1979 | Cohen | 351/161 |
| 4,210,391 | 7/1980 | Cohen | 351/161 |
| 4,338,005 | 7/1982 | Cohen | 351/161 |
| 4,340,283 | 7/1982 | Cohen | 351/161 |

Primary Examiner—John K. Corbin
Assistant Examiner—Scott J. Sugarman
Attorney, Agent, or Firm—Russell & Tucker

[57] ABSTRACT

A bifocal contact lens is described wherein at least the major viewing area is divided into a multiplicity of near and distant vision viewing zones, each near vision zone being adjacent to a distant vision zone or middle distance zone and there being at least 3 viewing zones in all, whereby the wearer is able to look through at least 2 zones of different power simultaneously. Normally the lens has at least 2 of each kind of viewing zone and the total surface area of the distant vision zones is substantially equal to the total surface area of the near vision zones.

17 Claims, 13 Drawing Figures

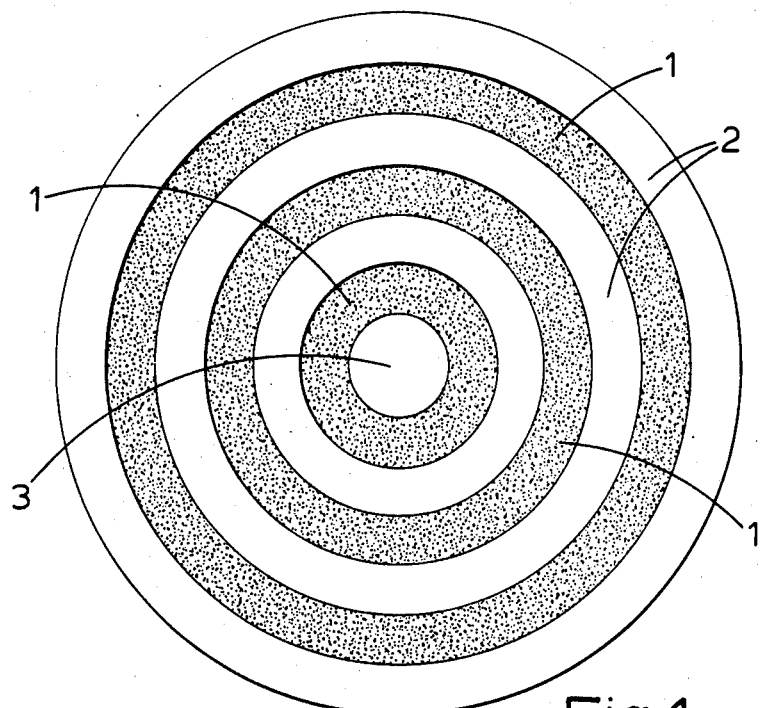
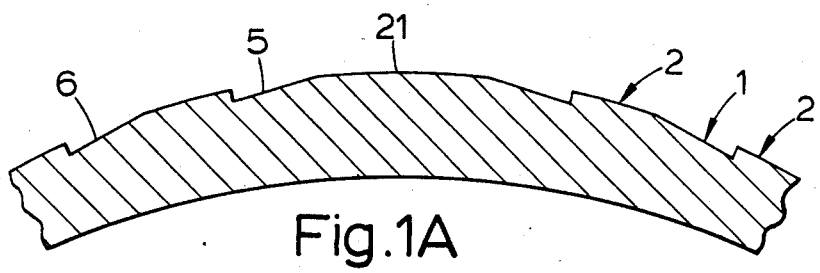
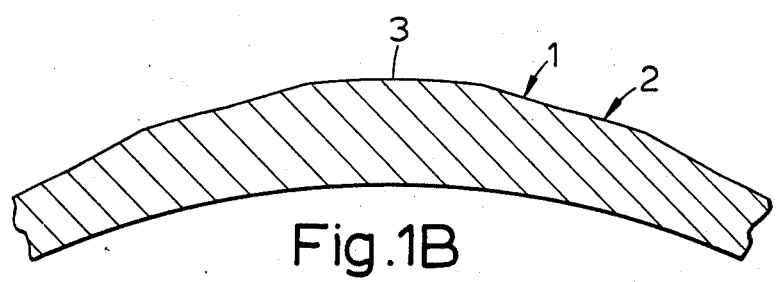

BIFOCAL CONTACT LENSES

BACKGROUND OF THE INVENTION

This invention relates to contact lenses and in particular to bifocal and trifocal contact lenses.

Conventional bifocal contact lenses can be divided into two main types, i.e.

1. Concentric bifocals in which the distance vision zone is in the centre and the reading or near vision zone is a peripheral ring or toroid around the central area. Occasionally the zones are reversed.
2. Bifocals which resemble scaled-down spectacle bifocal lenses. These lens comprise two D-shaped segments, the lower segment being the near vision zone.

In the case of the first type, the size of the central zone is critical, particularly if the lens is fitted tightly to the cornea so that little movement occurs on blinking. The amount of light entering the eye from the distant and near vision zones must be approximately equal, otherwise vision will be biased towards either distance or reading. As the pupil diameter is not static but varies according to the brightness of the light, a compromise must be made in selecting the size of the central zone. This problem is made worse by the fact that the difference in pupil size between the maximum and minimum varies from person to person.

Bifocal lenses of the second type generally have to be fitted slightly looser so that the lens can move over the cornea so that when the wearer is looking straight ahead the line dividing the two segments is below the centre of the pupil, while for reading the opposite situation applies. Thus the location of the dividing line between the distance and reading zones is critical for satisfactory fitting of this type of lens. Although variations in pupil size are less important in the case of this type they can affect the result.

For these reasons a large measure of trial and error inevitably occurs in fitting bifocal lenses of both types, and the practitioner therefore requires a very large inventory to cover all the necessary permutations.

SUMMARY OF THE INVENTION

A major object of this invention therefore is to provide bifocal lenses wherein pupil diameter and pupil fluctuations have little or no influence on the fitting of the lenses. In order to avoid unnecessary repetition the term "bifocal" is used in the following description and claims to include trifocal lenses, where the context admits.

According to the present invention, there is provided a bifocal contact lens wherein at least the major viewing area is divided into a multiplicity of near and distant vision viewing zones, each near vision zone being adjacent to a distant vision zone or middle distance zone whereby in normal use substantially equal amounts of light enter the eye through the near vision and distant vision zones. By the term "multiplicity of near and distant vision viewing zones" we mean that the lens has more than 3 viewing zones in all. In most lenses in accordance with the invention there will be at least 2 of each type of viewing zone and usually there will be more zones, e.g. 6 or 8 or more.

Generally the distant vision zones will substantially equal in total surface area the near vision zones of the lens, i.e. the ratio of the areas of the near and distant vision zones will be in the range of from about 60:40 to 40:60.

It is unnecessary for the whole surface of the lens to be divided into zones of different powers since it is only the portion of the lens which covers the pupil at its maximum opening which is normally used in vision correction.

There are many possible ways in which the surface of the lens can be divided geometrically into near and distant vision zones. The particular arrangement selected will depend in part on the method of manufacture adopted. For example, where the lens is manufactured on a lens lathe, the front surface may be formed with a series of concentric areas, each annular area being cut alternately for distant and near vision. Alternatively, the back surface can be machined to form the zones of different power.

Another technique for producing zones of different power in the lens is to incorporate segments of material having a different refractive index from that of the body of the lens. Using this approach the lens can be machined or moulded with a single power curvature, the different focal lengths of the near and distant vision zones being achieved by the difference in their refractive indices or their combination of refractive indices.

BRIEF DESCRIPTION OF THE DRAWINGS

Various embodiments of bifocal lenses in accordance with the invention will now be described by way of illustration only, with reference to the accompanying drawings in which:

FIG. 1 is a front plan view of one kind of bifocal lens,

FIG. 1A is a partial transverse section through the lens shown in FIG. 1,

FIG. 1B is a view similar to FIG. 1A of a similar lens in which the front surface has been cut in a slightly different manner.

DESCRIPTION OF THE PREFERRED EMBODIMENTS

Figure 2:
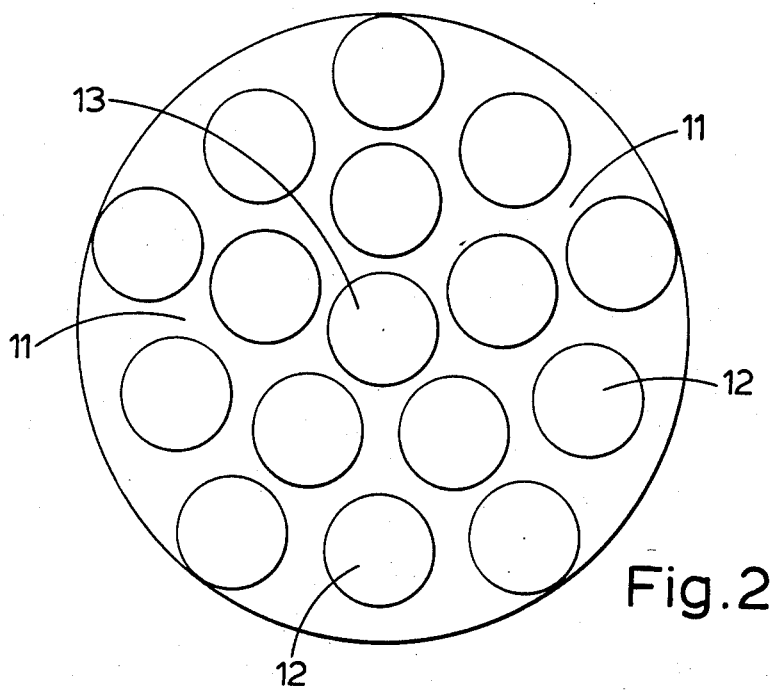
FIG. 2 is a plan view of the front of another lens in accordance with the invention.

In FIG. 1, a lens is shown having near and distant viewing zones formed as a series of concentric rings.

The shaded rings 1 denote the near vision viewing zones while the unshaded rings 2 denote the distant viewing zones. Of course, in reality, the rings 1 and 2 are equally transparent. These roles can however be reversed. As illustrated the central area 3 of the lens has a focal length which is appropriate for distant viewing while the adjacent zone 1 has a focal length appropriate for near vision viewing. A lens of this kind can be manufactured on a lens lathe by machining the entire power curve 21 initially for distant viewing and then taking a series of steeper cuts 5 and 6 (see FIG. 1A) to produce the shorter focal length zones 1 for near vision viewing between annular zones 2 for distant vision. The sharp steps produced by the cuts 5,6 can be avoided by continually changing the position of the centre of curvature when moving the cutting tool in a controlled manner to produce the profile shown in FIG. 1B. This profile has a central zone 3 whose curvature is appropriate for distant vision and a first annular zone 1 for near vision having a steeper curvature. Adjacent to and outside the first annular zone 1 is an annular zone 2 for distant vision which has the same curvature as zone 3 but on a different centre. The machining operation is repeated to form successive alternate zones 1 and 2 as shown in FIG. 1.

Another specific arrangement is illustrated in FIG. 2, in which the surface of the lens has a general background zone 11 whose focal length which is appropriate for near vision viewing (i.e. it has a power which is more positive than the distant vision zones of the lens). The distant vision area comprises a multiplicity of generally circular zones 12 uniformly dispersed over the power surface of the lens. One of the circular zones 13 is centred on the axis of the lens and the sum of the total surface areas of all the circular zones 12 is substantially equal to half the total surface area of the power surface of the lens.

Figure 3:
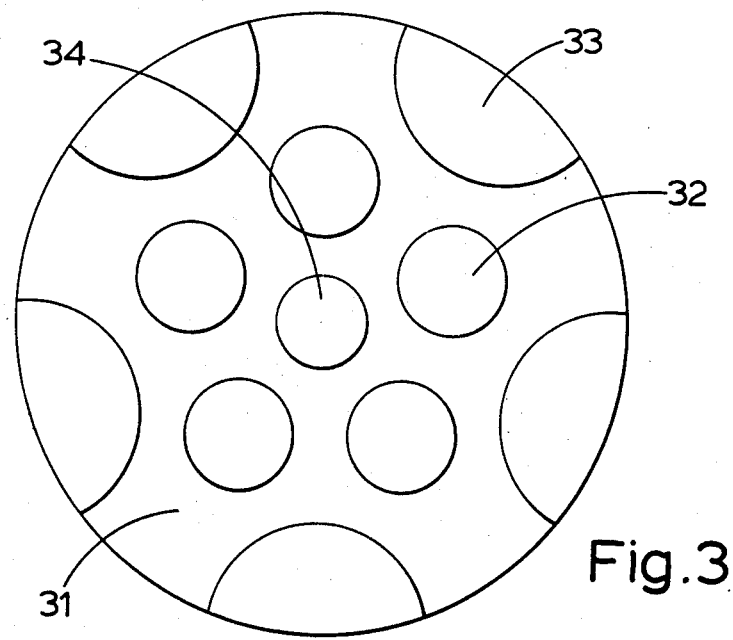
FIG. 3 is a plan view of the front of a third lens in accordance with the invention.

A modification of this lens is shown in FIG. 3. In this modification, the background zone 31 is again the near vision viewing area of the lens and the circular zones 32 are provided for distant vision. An area 34 for distant vision is located at the optical centre of the lens. Segments 33 are arranged around the periphery of the lens and these are intended for distant vision viewing, or alternatively for median distance viewing, where the lens is trifocal. The lenses shown in FIGS. 2 and 3 would preferably be manufactured by moulding but it would be possible to manufacture these embodiments by polishing a lens, whose power curve has been cut for distant vision, through a mask having apertures which correspond to zones 12 and 13. One half of a mould may be made using a metal block in which a number of cylindrical pegs, corresponding to the zones 12 and 13, and retractably mounted (but are not rotable) in the block. A first concave curve is cut on the tops of the pegs to correspond to the distant vision prescription and the pegs are then retracted into the block. A second concave curve is then cut in the block to form the reading zone curvature. When the pegs are extended to a position where their peripheries are coincident with the curved surface of the block, a moulding surface is produced for the profile of a lens as shown in FIG. 2. Of course the reverse procedure could be adopted, and the reading zones could be cut on the pegs and the distant vision zones cut on the block.

Although in the lenses shown in FIGS. 1 to 3, the zones of different power cover the whole surface of the lens, this is unnecessary since the extreme peripheral area of the lens is not normally used for viewing.

Figure 4:
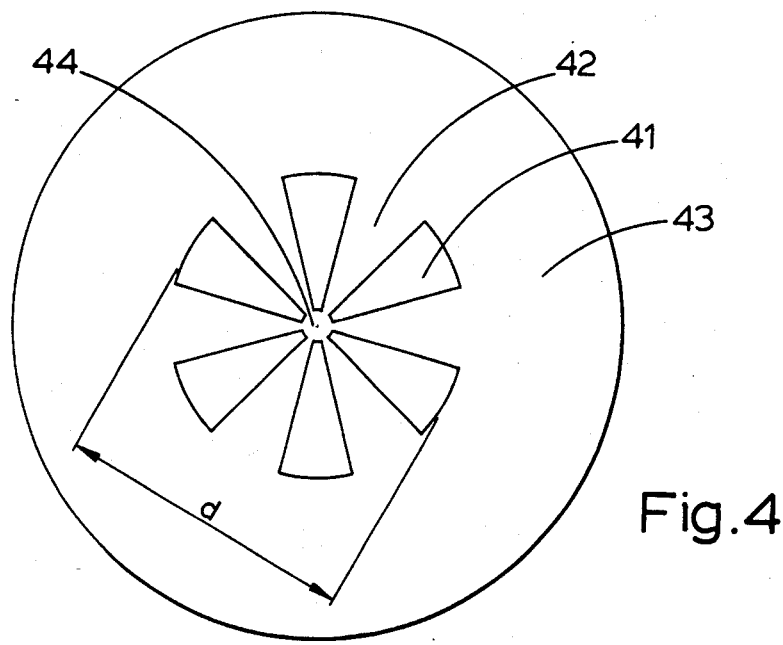
FIG. 4 is a plan view of the front surface of a fourth lens in accordance with the invention.

A type of configuration which is currently preferred is shown in FIG. 4. In this lens, the power surface is divided into sectors which radiate from the axis of the lens and are alternatively near vision sectors 41 and distant vision sectors 42. Near vision sectors 41 consist of portions of transparent material which preferably have a higher refractive index than that of the rest of the lens comprising the sectors 42 and the peripheral area 43. As vision through the centre of the lens may be distorted if the sectors continued to the geometric centre of the lens it is preferred that the sectors 41 stop short of the centre so that the central portion 44 has the same power as that of sectors 42 and the periphery 43.

Figure 5A:
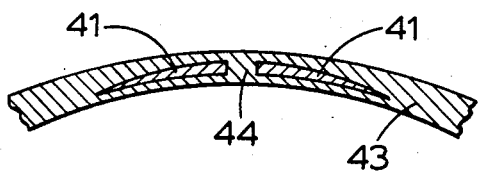
FIGS. 5A, 5B, and 5C are partial transverse sections through lenses of the kind shown in FIG. 4.
Figure 5B:
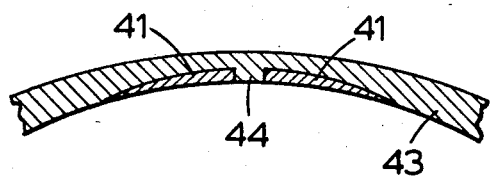
Figure 5C:
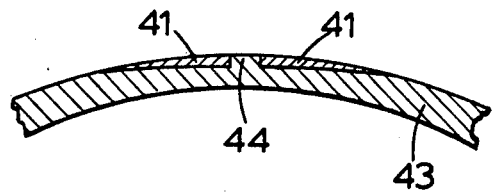

In FIGS. 5A, 5B and 5C, the sectors 41 are indicated as shaded areas and normally do not extend through the entire thickness of the lens. In FIG. 5A, the sectors 41 are totally encapsulated within the body of the lens, while in FIG. 5B, the sectors 41 are embedded in the body of the lens but lie with one face coincident with the general curvature of the back surface of the lens. The opposite situation applies in FIG. 5C in which the sectors lie with their front surfaces coincident with the general curvature of the front surface of the lens.

Sectors 41 provide the additional power required for reading vision. For many bifocal lens wearers an additional power of +2 to +2.5 diopters is required. In most cases the additional power required for a reading zone cannot be achieved solely by forming the sectors 41 in a material of higher refractive index than the material of the body of the lens. Therefore the lens segments will have their own positive power, the amount of which is determined by the curvature of their surfaces, as seen in FIGS. 5A, 5B and 5C.

Configurations such as are shown in FIG. 4 can be produced by casting conventional polymerisable compositions using polished steel moulds or polypropylene or Teflon coated moulds to form a composite blank or semi-finished lens followed by machining to produce the final lens.

Figure 6A:
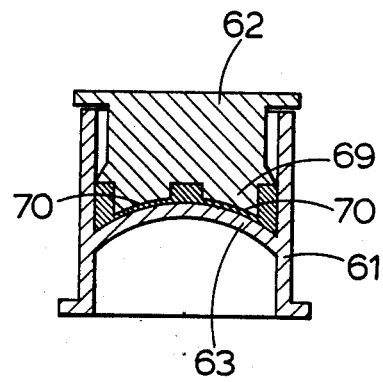
FIG. 6A is a vertical section through a mould for forming lenses in accordance with the invention.
Figure 6B:
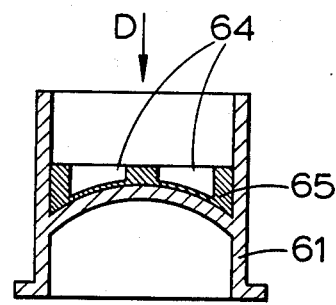
FIG. 6B is a section through the lower half of the mould shown in FIG. 6A and showing the casting produced.
Figure 6C:
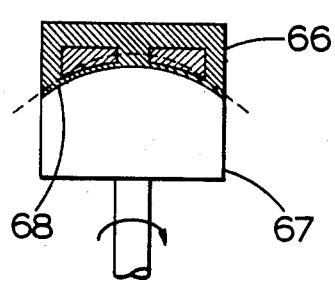
FIG. 6C is a diagrammatic view showing the step of machining the resulting casting.
Figure 6D:
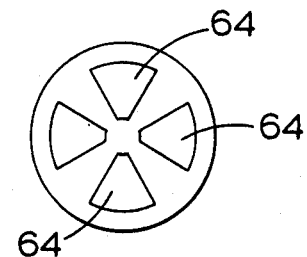
FIG. 6D is a view of the top of the casting viewed in the direction of the arrow D in FIG. 6B

One such method of manufacture is indicated in FIGS. 6A, 6B and 6C. FIG. 6A shows a pair of mould halves comprising a lower mould half 61 and an upper mould half 62. Lower mould half 61 has a base 63 having a curvature corresponding to the desired base curve of the lens. Upper mould half 62 has depending projections 69 which are shaped as truncated cones in plan (see FIG. 6D), but have curved lower surfaces 70 whose curvature corresponds to the power of reading vision zones of the final lens. A polymerisable composition containing a polymerisation initiator is poured into the lower mould half and the mould is then closed. After the polymerisation has been completed the mould is opened and the upper surface of the resultant moulding contains four recesses 64 whose shape corresponds to that of the projections 69 (see FIGS. 6B and 6D). Alternatively the projections 69 may be omitted and the recesses 64 produced by a machining step after the polymerisable composition has cured. A second polymerisable composition having a refractive index (when cured) which is greater than that of the cured body 65 is then poured into the open top of the mould half 61. The amount of this composition need only fill the recesses 64 but an excess may be poured into the mould. After the second polymerisable composition has cured, the resulting composite lens blank 66 is removed from the mould and bonded with thermoplastic adhesive, such as a wax adhesive, onto the chuck 67 of a lens lathe. Using the base curve 68 as the reference surface, a front curve is then cut as indicated by the dotted curve to produce a positive power lens and sectors 41 (see FIG. 5C) which have a greater positive power owing partly to their higher refractive index and partly to the curvature of the lower surfaces of sectors 41. The lens may then be released from the chuck by warming and the edges and surfaces polished in the conventional way. The resulting lens will be substantially as shown in FIGS. 4 and 5C except that there will be a total of 8 distant and near vision zones rather than 12 as shown in FIG. 4, and the lens will be positive.

Another method of manufacture suitable for producing lenses of the kind illustrated in FIGS. 4, 5A, 5B and 5C involves the following steps. A high negative power lens is cut on a block fitted in the chuck of the lens lathe. A number of sectors in the form of truncated cones are arranged on a base and embedded in a cylinder of plastics material, preferably of lower refractive index. One face of the cylinder is then cut to the same profile as that of the exposed surface of the negative lens and in such a way that the tool cuts into the sectors. The resulting cut surface is then stuck with a thermosetting adhesive to the negative power lens, which is still attached to the block. A front surface is then cut on the combined workpiece to form a lens in the form shown in FIG. 5C.

When manufacturing hard lenses, typical materials are polymethyl methacrylate and copolymers thereof, polyesters and polymers and copolymers of styrene. Polyesters and polymers containing styrene have a higher refractive index than polymethacrylates or polyacrylates.

Referring to FIG. 4, the diameter 'd' of the area covered by the sectors 41 is typically about 6 mm., while the overall diameter will be about 9 to 10 mm. for a hard lens or about 13 to 14 mm for a soft lens. With a typical closeness of fitting, the lens will tend to move over a distance of about 2 mm. Since pupil diameter in average bright intensity is about 4 mm., the pupil area will remain covered at all times by the area defined by the sectors. Because substantially equal amounts of light reach the pupil through the sectors 41 and the zones 42 over substantially the whole of this area fitting of the lens becomes independent of the pupil size and fluctuations in pupil size with different light conditions.

While casting and machining are the preferred methods of producing lenses in accordance with the invention, it may be possible to utilize injection or compression moulding techniques.

It will be appreciated that configurations other than those shown in the accompanying drawings are possible. For example, the major viewing areas may be formed as a series of small contiguous polygonal zones, e.g. hexagons (as seen in plan). Preferably these zones are arranged so that there is substantially uniform distribution of polygonal near vision zones and distant vision zones over the major viewing area.

Preferably the lenses shown in FIGS. 4, 5A, 5B, 5C, 6A, 6B and 6C have about 4 to 20 sectors, generally 6 to 10. Some of the sectors may be for middle distance viewing.

Lenses manufactured in accordance with the invention may be hard or soft and produced by polymerisation of the known monomer mixtures. In the case of soft lenses, the lenses are machined in hard conditions and, after shaping and polishing, swollen in the usual isotonic swelling solutions. When manufacturing by moulding, a degassed polymerisation mixture is poured into a suitably shaped mould half, the mould is closed with the other mould half and the mixture maintained at a controlled temperature or temperature cycle usually between 40° C. and 100° C., until polymerisation is substantially complete. The castings are removed from the moulds, polished (if necessary) and swollen in an appropriate aqueous solution e.g. isotonic saline. A variety of polymerisation recipes are possible, for example, as described in British Pat. Nos. 1,385,677 and 1,475,605 (De Carle), 829,565 (Wichterle) and 1,436,705 (N.R.D.C.), the disclosure of which is specifically imported herein.

Polymers having different refractive indices are readily prepared by suitable selection of the composition monomer mixtures. In order to ensure compatibility it is advisable, where applicable, to select a similar polymerisable composition for the main body of the lens as for the inclusions, such as sectors 41, and to achieve a difference in refractive index by alteration in the relative proportions of the monomers or by incorporating a modifying monomer. In the case of soft (hydrophilic) lenses it is important to select polymer compositions which have a similar swell factor, otherwise the lens may be subjected to internal strains causing internal breakdown in the bonds between the different polymers.

It is a surprising feature of the lenses of the present invention that although the wearer will actually be able to look through two or more zones of different focal length at the same time, after a short acclimatisation period, the wearer learns to discriminate between the images and to ignore the images which are out of focus. After a while, the wearer is no longer conscious that he is seeing several images but is only aware of the one which is in focus, for the particular object or view he is looking at. This situation is achieved so long as the relative zones of distant and near vision (or distant, middle and near vision) portions of the lens are essentially in balance. Thus for a bifocal lens I aim to have approximately half the total viewed area each for distant and near vision. It is however possible to depart somewhat from the 50/50 situation and, for example, provide zones in the relative proportion of 60/40 or 40/60. Also it may be preferable not to distribute the areas entirely uniformly and perhaps provide a greater area of reading vision towards the periphery of the lens.

I claim:

1. A bifocal contact lens wherein at least the major viewing area is divided into a plurality of non-concentric near and distant vision zones, each near vision zone being adjacent to a distant vision zone; there being between at least about 2 zones of each kind in said major viewing area, and wherein the relative areas of the zones are such that in use substantially equal amounts of light enter the eye through the near vision zones and through the distant vision zones respectively.

2. A lens according to claim 1 in which the ratio of the total area of the distant vision zones to the total area of the near vision zones is from about 60:40 to 40:60.

3. A lens according to claim 1 wherein there are between about 2 and about 8 zones of each kind in said major viewing area.

4. A lens according to claim 3 in which there is a central circular area consisting of a distant vision zone located at the optical center of the lens.

5. A lens according to claim 3 in which the distant vision zones comprise a plurality of generally circular areas distributed over a surface of the lens.

6. A lens according to claim 3 in which the near vision zones comprise a plurality of generally circular areas distributed over a surface of the lens.

7. A lens according to claim 3 in which the distant and near vision zones are produced by machining the front or back surface of the lens.

8. A lens according to claim 1 which has been formed by casting a polymerisable liquid monomer mixture.

9. A lens according to claim 1 which is a soft lens.

10. A bifocal contact lens having a major viewing area which is divided into a plurality of non-concentric near and distant vision zones wherein:
  (a) each near vision zone is adjacent to distant vision zone,
  (b) there being between about 2 and about 8 zones of each kind in said major viewing area,
  (c) the ratio of the total area of the distant vision to the near vision zones being from about 60:40 to about 40:60, and
  (d) the distant vision zones comprise a plurality of generally circular areas distributed over said major viewing area.

11. A bifocal contact lens having a viewing area which is divided into sectors radiating outwardly from an axis of the lens wherein adjacent sectors constitute near and distant vision zones having a first power and a second power respectively and wherein the ratio of the total area of the near vision zones to the total area of the distant vision zones is from about 60:40 to 40:60.

12. A lens according to claim 11 in which the sectors radiate from a central area which is of one of said powers.

13. A lens according to claim 11 in which the sectors are of substantially the same shape and area.

14. A lens according to claim 11 in which the sectors result from the presence in the body of the lens of segments of transparent plastics material having a different refractive index from that of the body of the lens.

15. A lens according to claim 11 in which the segments have a higher power than the remainder of the lens because their curvature is steeper than that of the remainder of the lens.

16. A lens according to claim 11 formed by casting at least one polymerisable liquid monomer composition.

17. A lens according to claim 11 which is a hard lens.

* * * * *